United States Patent
Yu et al.

(10) Patent No.: US 8,479,887 B2
(45) Date of Patent: Jul. 9, 2013

(54) CORD AND POLYMER JACKET ASSEMBLY HAVING A FLAME RETARDANT IN THE POLYMER JACKET MATERIAL

(75) Inventors: Xiaomei Yu, Glastonbury, CT (US); Gopal R. Krishnan, Wethersfield, CT (US); John P. Wesson, Vernon, CT (US); John M. Milton-Benoit, West Suffield, CT (US); Wayde R. Schmidt, Pomfret Center, CT (US)

(73) Assignee: Otis Elevator Company, Farmington, CT (US)

( * ) Notice: Subject to any disclaimer, the term of this patent is extended or adjusted under 35 U.S.C. 154(b) by 302 days.

(21) Appl. No.: 13/002,355

(22) PCT Filed: Aug. 15, 2008

(86) PCT No.: PCT/US2008/073236
§ 371 (c)(1),
(2), (4) Date: Jan. 3, 2011

(87) PCT Pub. No.: WO2010/019151
PCT Pub. Date: Feb. 18, 2010

(65) Prior Publication Data
US 2011/0100759 A1    May 5, 2011

(51) Int. Cl.
*B66B 7/06* (2006.01)
*B66B 11/00* (2006.01)
*B05D 5/00* (2006.01)

(52) U.S. Cl.
USPC ............... 187/251; 187/250; 428/68; 428/76

(58) Field of Classification Search
USPC ............... 428/76, 68; 187/251, 250
See application file for complete search history.

(56) References Cited

U.S. PATENT DOCUMENTS

| | | | |
|---|---|---|---|
| 4,542,170 | A | 9/1985 | Hall et al. |
| 6,739,433 | B1 | 5/2004 | Baranda et al. |
| 6,933,345 | B1 | 8/2005 | Lichtenhan et al. |
| 7,265,194 | B1 | 9/2007 | Lichtenhan et al. |
| 7,518,064 | B2 | 4/2009 | Morioka et al. |
| 2003/0089551 | A1* | 5/2003 | Kato et al. ............ 182/1 |
| 2004/0216959 | A1* | 11/2004 | Ach ............ 187/264 |

(Continued)

FOREIGN PATENT DOCUMENTS

| CA | 2596716 | 2/2008 |
|---|---|---|
| CN | 101070387 A | 11/2007 |

(Continued)

OTHER PUBLICATIONS

Molkow M: "Wire Ropes and New Suspension Means—Design, Use, Safety, Handling and Care, Discard Criteria," Lift-Report, VFZ Verlag, Dortmunt, DE, vol. 27, No. 5 (Sep. 1, 2001), pp. 14, 16, 18-20, XP001092527, ISSN: 0341-3721.

(Continued)

*Primary Examiner* — Brent O'Hern
(74) *Attorney, Agent, or Firm* — Carlson, Gaskey & Olds PC

(57) ABSTRACT

An exemplary assembly includes at least one elongated tension member. A jacket covers at least some of the tension member. The jacket comprises a polymer material. The assembly includes a flame retardant selected from a group consisting of a halogen-free melamine based intumescent or a filled polymer having a nanoscale filler chemically bonded to a matrix phase.

6 Claims, 3 Drawing Sheets

U.S. PATENT DOCUMENTS

| | | | |
|---|---|---|---|
| 2004/0262087 A1* | 12/2004 | Ach | 187/264 |
| 2006/0182967 A1 | 8/2006 | Kosaka et al. | |
| 2007/0084671 A1* | 4/2007 | Ach | 187/261 |
| 2008/0171823 A1 | 7/2008 | Rafailovich et al. | |

FOREIGN PATENT DOCUMENTS

| | | |
|---|---|---|
| DE | 29924773 U1 | 8/2005 |
| EP | 1060305 B1 | 1/2006 |
| EP | 1655741 A1 | 5/2006 |
| EP | 1927608 A1 | 6/2008 |
| FR | 2888255 A1 | 1/2007 |
| GB | 1408133 | 11/1972 |
| GB | 2433831 A | 7/2007 |
| JP | 6391119 | 6/1988 |
| JP | 452893 | 12/1992 |
| JP | 2002327062 A | 11/2002 |
| JP | 2004219815 A | 8/2004 |
| WO | 0037738 | 6/2000 |
| WO | 0056840 | 9/2000 |
| WO | 2006094250 A1 | 9/2006 |
| WO | 2007050069 A1 | 5/2007 |
| WO | 2007130407 A1 | 11/2007 |
| WO | 2008011941 A1 | 1/2008 |
| WO | 2008061229 A1 | 5/2008 |

OTHER PUBLICATIONS

Anonymous: "Melamine derivatives," (Oct. 22, 2007), Retrieved from the Internet: URL:http://web.archive.org/web/20071022175659/http://specialchem4polymers.com/tc/Melamine-Flame-Retardants/index.aspx?id=4004.

International Preliminary Report on Patentability for International application No. PCT/US2008/073236 mailed Feb. 24, 2011.

International Search Report and Written Opinion of the International Searching Authority for International application No. PCT/US08/73236 mailed Jul. 26, 2009.

* cited by examiner

CORD AND POLYMER JACKET ASSEMBLY HAVING A FLAME RETARDANT IN THE POLYMER JACKET MATERIAL

BACKGROUND

There are various uses for elongated flexible assemblies such as for elevator load bearing members or roping arrangements, drive belts for machines such as a passenger conveyor and handrails for passenger conveyors, for example. Such assemblies may be designed with a plurality of cords covered by a polyurethane jacket. For example, U.S. Pat. Nos. 6,295,799 and 6,739,433 show belts for use in suspending an elevator car and counterweight within an elevator system. An example passenger conveyor handrail construction is shown in U.S. Pat. No. 4,982,829. An example passenger conveyor drive belt is shown in U.S. Pat. No. 6,540,060.

One aspect of such assemblies is that the jacket could burn when in an environment that could instigate combustion such as exposure to flames. Providing an ability to resist or minimize any burning of the jacket would be useful. One challenge when considering making such a jacket flame-resistant is keeping the desired qualities of the jacket material. The examples mentioned above all need a certain flexibility to follow a path of movement while the assembly is in use. It is also desirable to have proper surface characteristics for the intended use of the assembly.

Flame retardant polyurethane compositions have been suggested. For example, U.S. Pat. No. 4,542,170 uses a pentate salt and a phosphate combination to provide flame retarding properties. Not all flame retardants are compatible with the requirements for the example assemblies mentioned above.

SUMMARY

An exemplary assembly includes at least one elongated tension member. A jacket covers at least some of the tension member. The jacket comprises a polymer material. The assembly includes a flame retardant selected from a group consisting of a halogen-free melamine based intumescent or a filled polymer having a nanoscale filler chemically bonded to a matrix phase.

An exemplary method of making an assembly having at least one elongated tension member at least partially covered by a jacket includes providing a flame retardant and a polymer material. Forming a jacket includes applying the polymer material to the tension member to form a jacket of a desired shape. The flame retardant is included in the assembly.

The various features and advantages of the disclosed examples will become apparent to those skilled in the art from the following detailed description. The drawings that accompany the detailed description can be briefly described as follows.

DETAILED DESCRIPTION

Assemblies designed according to embodiments of this invention include a flame retardant within a polymer jacket material. As used in this description, flame retardant means inhibiting or resisting the spread of fire. In some circumstances, the flame retardant inhibits or resists the spread of fire by self-extinguishing. The ability to stop a fire completely may depend on the amount of exposure to a flame source. In most circumstances, the flame retardant will at least form a char surface and dilute oxygen content in surrounding air to limit or retard any spread of fire otherwise associated with the jacket burning.

Figure 1:
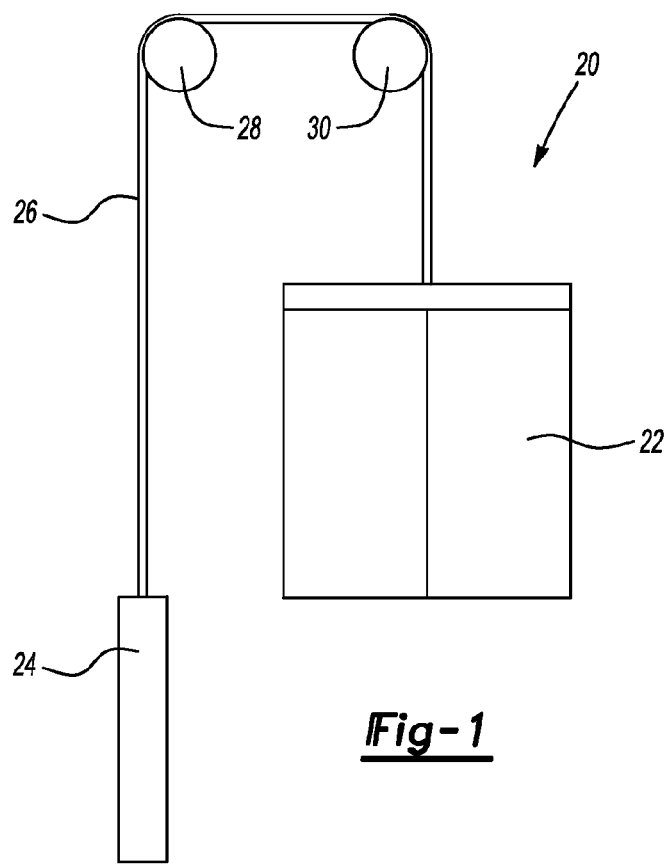
FIG. 1 schematically illustrates selected portions of an elevator system including a load bearing member designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes. Other elevator system components are not illustrated or described as they are not necessary for understanding the disclosed example embodiments of this invention.

The load bearing assembly 26 supports the weight of the elevator car 22 and the counterweight 24 and facilitates movement of the elevator car 22 into desired positions by moving along sheaves 28 and 30. One of the sheaves will be a traction sheave that is moved by an elevator machine in a known manner to cause the desired movement and placement of the elevator car 22. The other sheave in this example is an idler sheave. It is necessary for the load bearing assembly 26 to bend and wrap partially around the sheaves 28 and 30 when the assembly 26 moves responsive to movement of the traction sheave.

Figure 2:
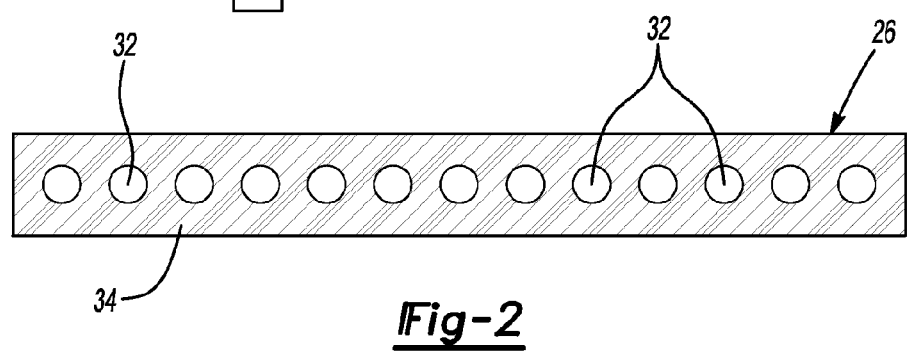
FIG. 2 is an end view schematically showing one example elevator load bearing member assembly.

FIG. 2 is an end view schematically showing one example flat belt configuration of the example load bearing assembly 26. In this example, the flat belt includes a plurality of elongated cord tension members 32 and a polymer jacket 34 that contacts the tension members 32. In this example, the jacket 34 encases the tension members 32. In another exemplary embodiment, the jacket 34 at least partially covers the tension members 32. In one example, the tension members 32 comprise wound metallic cords, such as steel. The polymer jacket 34 in one example comprises a thermoplastic elastomer. In one example, the jacket 34 comprises a thermoplastic polyurethane.

Figure 3:
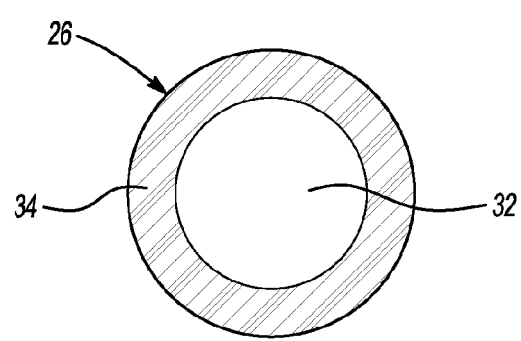
FIG. 3 is an end view schematically illustrating another example elevator load bearing assembly.

Another example is schematically shown in FIG. 3. An end view of a rope used as part of the load bearing assembly 26 includes at least one tension member 32 and a polymer jacket 34. In the example of FIG. 3, the same materials can be used as those mentioned above.

The load on the example load bearing assemblies 26 is carried by the tension members 32. The interaction between the jacket 34 and the sheaves 28, 30 requires a desired amount of friction to achieve sufficient traction, for example. Maintaining the desired coefficient of friction ensures consistent system performance. The interface between the tension members 32 and the jacket 34 must also include a sufficient bond at the interface. An adequate bond facilitates load transfer between the jacket 34 and the tension members 32. A stronger bond yields a stronger load bearing capacity.

Figure 4:
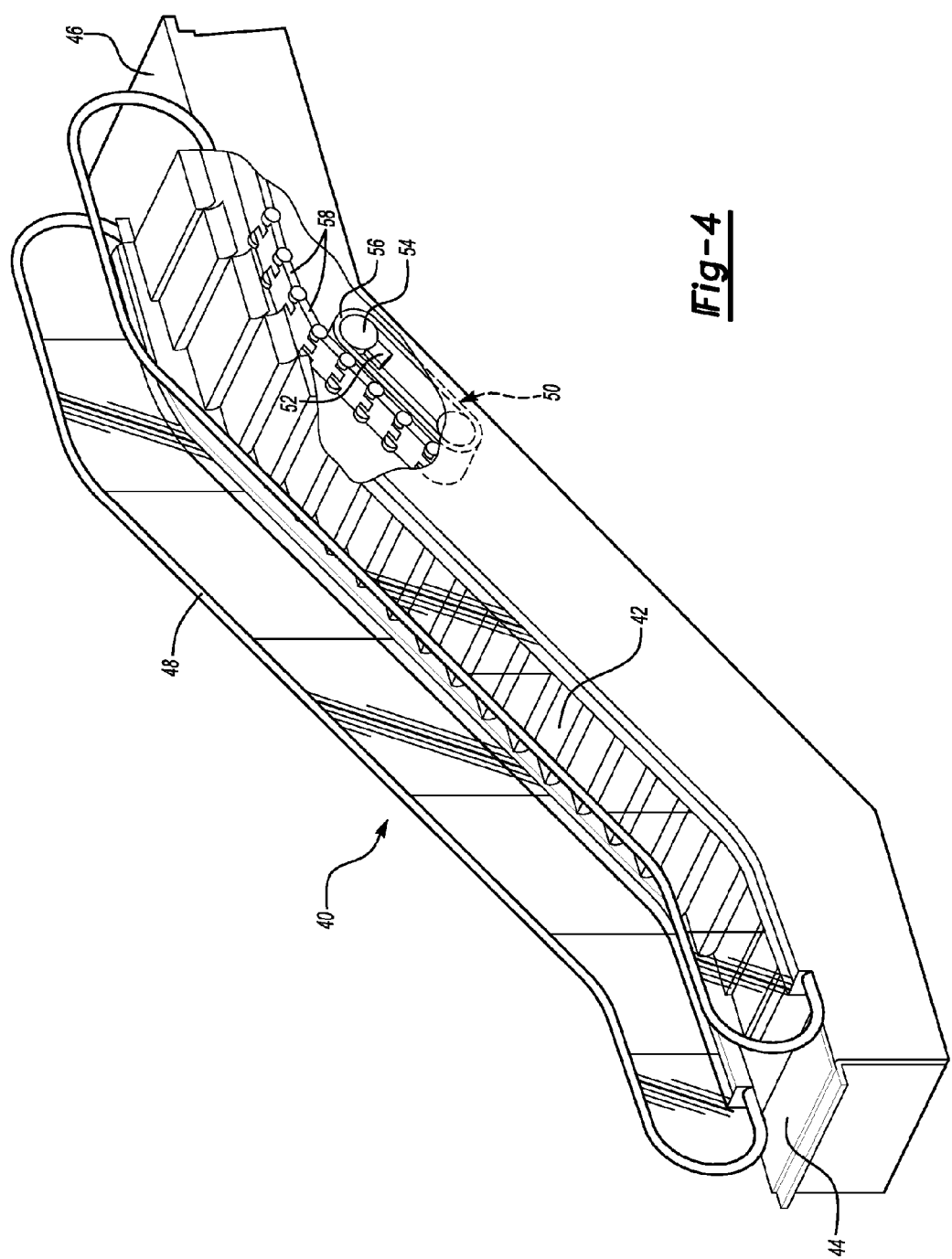
FIG. 4 diagrammatically illustrates a passenger conveyor including a drive belt and a handrail designed according to an embodiment of this invention.

FIG. 4 schematically illustrates an example passenger conveyor 40. In this example, a plurality of steps 42 move in a known manner to carry passengers between landings 44 and 46. A handrail 48 is provided for passengers to grasp while traveling on the conveyor 40.

Figure 6:
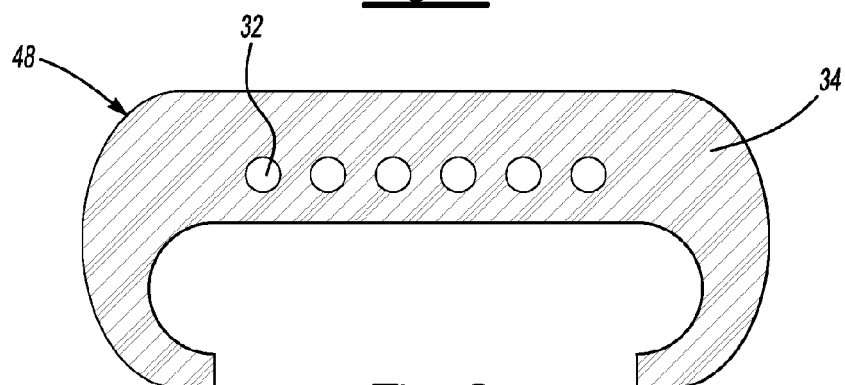
FIG. 6 schematically shows an example handrail configuration.

As shown in FIG. 6, the handrail 48 includes a plurality of tension members 32 such as steel cords at least partially covered by a polymer jacket 34. The polymer jacket in this example establishes the gripping surface and the body of the handrail 48.

Figure 5:
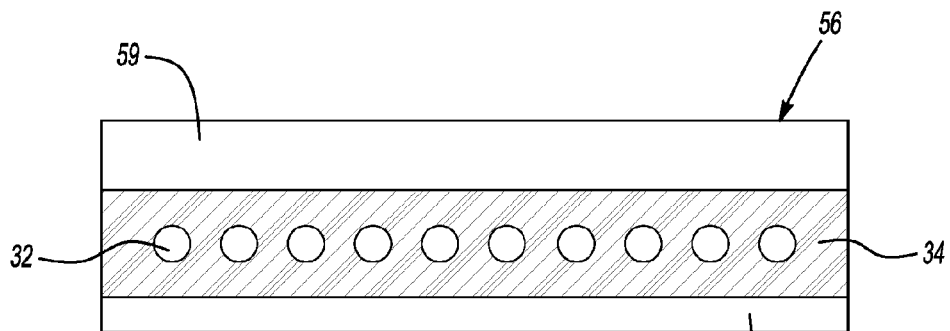
FIG. 5 schematically shows an example drive belt configuration.

The example of FIG. 4 includes a drive arrangement 50 for propelling the steps 42 in a desired direction. A motor 52 rotates a drive sheave 54 to cause movement of a drive belt 56. As shown in FIG. 5, the example drive belt 56 has a plurality of elongated cord tension members 32 covered by a jacket 34. The jacket material establishes teeth 57 that interact with a corresponding surface on the drive sheave 54. A step chain 58 (FIG. 4) is engaged by teeth 59 on the drive belt 56 to cause the desired movement of the steps 42.

The flame retardant in the polymer material of the jacket comprises one of a halogen-free melamine-based intumescent or a filled polymer having a nanoscale filler chemically bonded to a matrix phase.

In examples where the flame retardant is a halogen-free melamine based intumescent, the flame retardant comprises a melamine salt. One example flame retardant comprises melamine cyanurate. Another example comprises melamine-phosphate. Another example comprises melamine-pyrophosphate. Another example comprises melamine-polyphosphate.

Each of these example flame retardants have good compatibility with the base resin of the polymer jacket material. These example flame retardants also have good thermal stability, high flame retardancy based on multi-functional retarding mechanisms and good compatibility with the tension members 32 within the assembly. Additionally, these example flame retardants have good compatibility with other components such as traction sheaves in an elevator system. Additionally, these example flame retardants do not interfere with the flexibility characteristics of the jacket as required for a particular installation.

The example flame retardants function by interfering with one of three components that initiate or support combustion, namely heat, fuel and oxygen. The working mechanism of the example flame retardants includes combined functions as a fuel diluter (as the flame retardant releases inert gas), an oxygen scavenger and a heat blocker. In an initial stage, the halogen-free melamine-based intumescent examples can retard ignition by causing a heat sink through endothermic dissociation in case of a melamine salt followed by endothermic sublimation of the melamine itself at approximately 350° C. Another, even larger, heat sink effect is generated by the subsequent decomposition of the melamine vapors.

Melamine-based intumescents can be regarded as poor fuel for a fire having a heat combustion of only approximately forty percent of that of hydrocarbons. Furthermore, the nitrogen produced by combustion acts as an inert diluent. Another source of inert diluent is the ammonia which is released during breakdown of the melamine or self-condensation of the melamine fraction which does not sublime.

Melamine-based intumescents also have the characteristic of showing considerable contribution to the formation of a char layer in the intumescent process. The char layer acts as a barrier between oxygen and polymeric decomposition gases. Char stability is enhanced by multi-ring structures formed during self-condensation of melamine. In combination with phosphorous synergists, melamine can further increase char stability through formation of nitrogen-phosphorous substances. Additionally, melamine can act as a blowing agent for the char, enhancing the heat barrier functionality of the char layer.

In the above examples including a phosphate component, the phosphate is a good forming agent for a char to provide a physical bather of fuel and heat to block the combustion process. Therefore, the example flame retardants are highly efficient yet relatively simple to incorporate into a polymer jacket material of the type used in the example assemblies. The example jackets become flame retarding as the flame retardant is compounded with the jacket material. As described below, in some examples the flame retardant is mixed in with the base resin of the jacket material. Unlike other flame retardant technologies that require synergistic interaction of multiple flame retardants, one composition such as those mentioned above is effective to render the jacket material flame retardant.

The example flame retardants have good compatibility with the base resin of the jacket material because of their chemical composition. The flame retardants have polar, nitrogen and oxygen rich compounds that are similar to those of the jacket resin. This provides an efficiency and simplicity as the chemical bonds of the polymer base resins and the flame retardant are chemically compatible, which promotes mixing.

Another feature of the example flame retardants is that they have good hydrolytic stability because they have a relatively low hydrophilicity and they possess low water solubility. Additionally, the example flame retardants have good thermal stability during processing such as the procedure for forming the jacket.

Other examples include a flame retardant comprising a filled polymer having a nanoscale filler chemically bonded to a matrix phase. One such example includes polyhedral oligomeric silsequioxanes (POSS). Such a flame retardant is a silicon-based additive material that is suitable for providing a fire, flame or smoke retarding effect. POSS molecules can be thought of as the smallest particles of silica that are possible to manufacture. Unlike silica or modified clays, however, each POSS molecule contains covalently bonded reactive functionalities suitable for polymerization or grafting POSS monomers to polymer chains such as those within the jacket material (e.g., TPU). Each POSS molecule contains non-reactive organic functionalities for solubility and compatibility of the POSS segments and the various polymer systems used in the example assemblies mentioned above. The chemical diversity of POSS technology is very broad and a large number of POSS monomers and polymers are currently available in liquid or solid form. POSS monomers are typically soluble in common solvents. POSS technology, therefore, can be used in the same manner as common organics in a monomer or polymeric (i.e., resin) form.

A flame retardant including POSS molecules is readily useable in that POSS chemical feed stocks can be added to nearly all polymer types without introducing manufacturing complexities. Enhancement from the physical properties of polymers that include POSS segments result from the ability of the POSS to control motion of the polymer chains while still maintaining the processability and mechanical properties of the base resin. This is a direct result of POSS's nanoscopic size and its relationship to polymer dimensions.

Polymers containing POSS additives provide delayed combustion and reduction in heat evolution compared to some other flame retardant plastics. Incorporating a POSS additive into the jacket material also has the effect of increasing the useable temperature range for the finished product. Some of the features that render POSS systems advantageous compared to others include the POSS particle size, hygroscopic nature, oxygen permeability, high temperature stability, chemical reactivity, polymer blending, interfacial properties, mechanical properties and corrosion resistance.

As described in connection with FIG. 7 below, the POSS-based flame retardant is added in the synthesis stream of the processing of the jacket material.

In some examples, the amount of POSS components within the finished jacket material is less than ten weight percent.

Another example flame retardant comprises carbon nanotubes. Carbon nanofibers or nanotubes are believed to provide superior flame retardant performance over nanoclays, for example. Carbon nanofibers also increase the mechanical strength of a polyurethane and potentially provide friction benefits.

In some examples, having as little as 0.5 weight percentage of carbon nanotubes within a polymer jacket material reduces the magnitude of heat release, extends the time of heat release or both. In other words, the presence of carbon nanotubes provides a more fire retardant material.

While a variety of different flame retardants are described above that can each be used individually within a polymer jacket material, it is possible to combine more than one of them within a single formulation.

When a metal is used for the any of the example tension members 32, the metal material may be uncoated, coated, or plated with a protective metal. For example, a base ferrous metal may be coated or plated with zinc, tin or copper.

Figure 7:
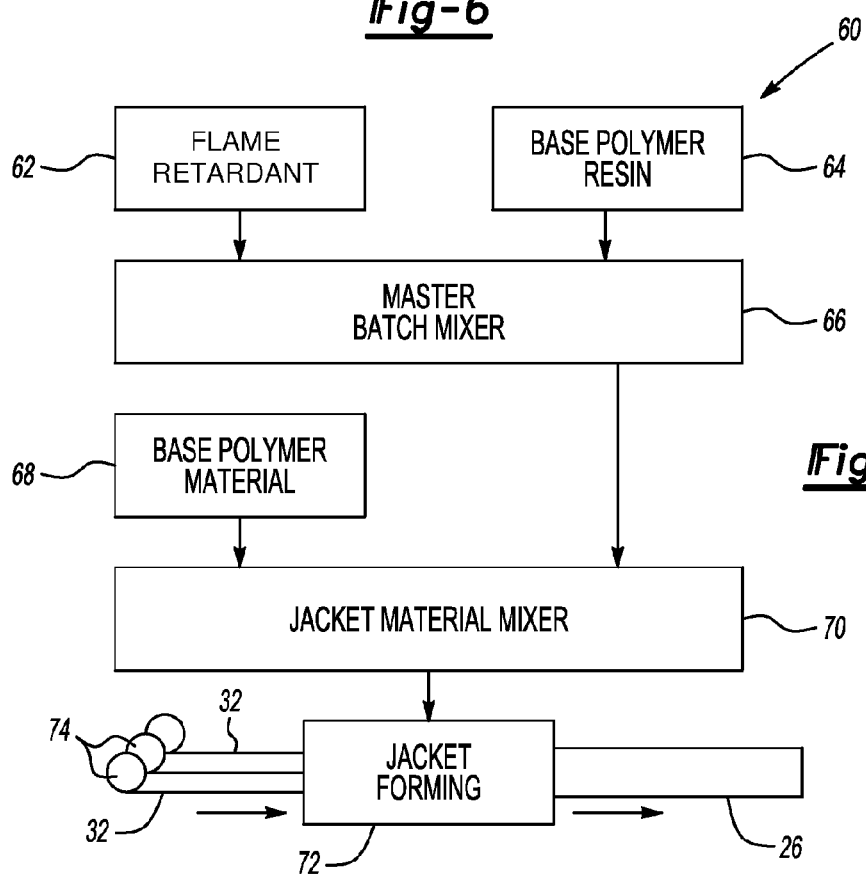
FIG. 7 schematically illustrates an example method of making an assembly designed according to an embodiment of this invention.

FIG. 7 schematically illustrates a method at 60 of making an assembly such as an elevator load bearing member, a passenger conveyor handrail or a drive belt such as that used for a passenger conveyor. A flame retardant 62 is mixed with a supply of base polymer resin 64 in a master batch mixer 66.

The amount of flame retardant selected will depend, in part, on the selection of flame retardant material. In the case of a halogen-free melamine intumescent, the master batch may include between about 20% and about 50% (by weight) of the selected flame retardant. The eventual jacket material in some examples includes between 0.2% and 20% by weight flame retardant within the jacket material. In the case of a POSS-based flame retardant, the final jacket material in some examples includes less than 10% by weight of the flame retardant. When carbon nanotubes are used as the flame retardant, between about 0.5% and about 10% by weight of the jacket material comprises the flame retardant.

Referring to FIG. 7, the jacket material is formed in a jacket forming station 72 such as a molding device to provide the desired geometry of the jacket. In the illustrated example, a plurality of spools 74 supply tension members 32 to the jacket forming station 72 where the jacket is molded onto at least one exterior surface of the tension members 32 resulting in the desired assembly. In the case of FIG. 7, the resulting assembly is an elevator load bearing member 26.

The presence of the flame retardant does not interfere with or adversely change other properties of the jacket material such as the flexibility of the base polymer material so that the jacket functions as desired for its particular application (e.g., is able to follow a guidance when the assembly comprises a passenger conveyor handrail, is able to transmit a sufficient drive force when the assembly comprises a drive member such as a belt or is able to wrap around sheaves and achieve sufficient traction for moving an elevator car when the assembly comprises an elevator load bearing member). Additionally, the ability to mold the jacket into a desired shape and to maintain good adhesion between the jacket 34 and the tension members 32 is not compromised. In fact, adhesion between the material of the jacket 34 and the tension members 32 is improved by the presence of the flame retardant in the jacket material in some examples.

With the example flame retardants, the jacket of an assembly also has good thermal stability, hydrolytic stability, low hydrophilic characteristics and good compatibility to interact with other components such as an elevator sheave or a passenger conveyor step chain.

In another example, the flame retardant material is incorporated into the assembly without being mixed directly into the jacket material. In one example, at least one of the above example flame retardant materials is incorporated into the jacket by inserting the flame retardant material into voids in a preformed jacket. This may be done on a macro or nano scale. In one such example, the flame retardant material is chemically bonded to the preformed jacket material. In another example, the flame retardant material is not chemically bonded to the jacket material but is held in place by its location within the appropriate voids in the preformed jacket.

In some examples, at least one void in the preformed jacket extends along at least selected lengths of the assembly and is filled with flame retardant material such as those described above. In one such example a void extends along the length of the assembly parallel to the tension members and is filled with flame retardant material.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
    an elevator car; and
    a load bearing member that supports a load of the elevator car, the load bearing member comprising:
        at least one elongated cord tension member;
        a jacket covering at least some of the at least one tension member, the jacket comprising:
            (a) a thermoplastic polymer material; and
            (b) a flame retardant selected from a group consisting of:
                (i) a halogen-free melamine based intumescent comprising melamine cyanurate, melamine-phosphate, melamine pyrophosphate or melamine polyphosphate in an amount up to about 20% by weight of the thermoplastic polymer; or
                (ii) a filled polymer having a nanoscale filler chemically bonded to a matrix phase.

2. The elevator system of claim 1, wherein the nanoscale filler comprises a polyhedral oligomeric silsequioxane.

3. The elevator system of claim 1, wherein the nanoscale filler comprises carbon nanotubes or carbon nanofibers.

4. The elevator system of claim 1, wherein the at least one elongated cord tension member comprises a plurality of elongated cord tension members at least partially covered by the jacket.

5. The elevator system of claim 1, wherein the elevator load bearing member comprises a flat belt or a round rope.

6. The elevator system of claim 1, wherein the thermoplastic polymer material comprises between about 0.2% and about 10% by weight of the flame retardant.

* * * * *